April 23, 1963   L. PÉRAS   3,086,615
AIR LINE LUBRICATOR
Filed Dec. 14, 1959   2 Sheets-Sheet 1
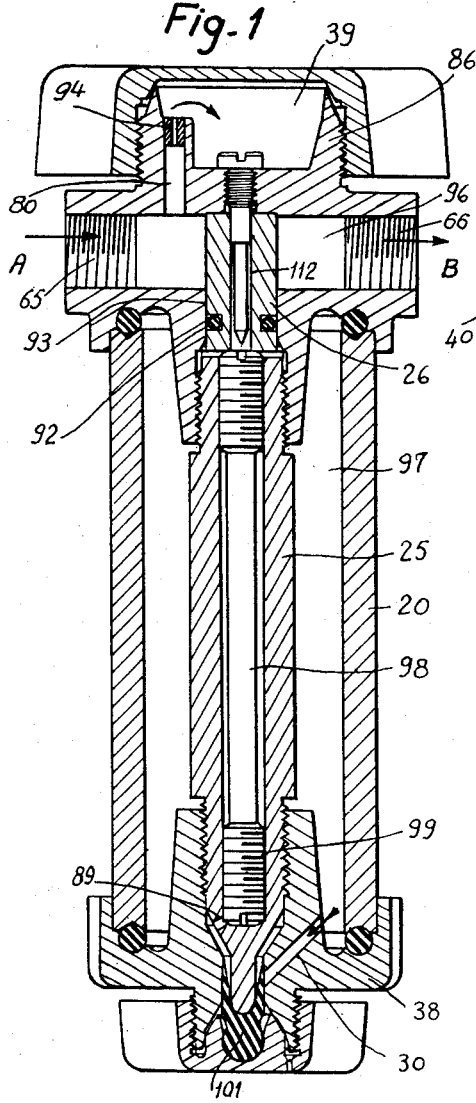
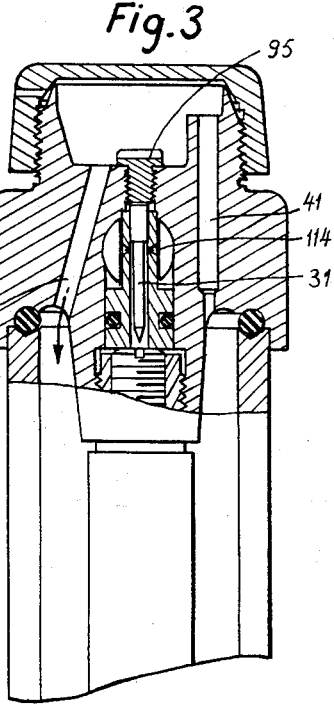
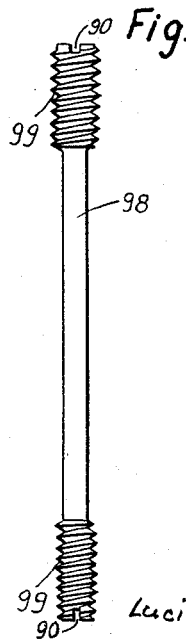
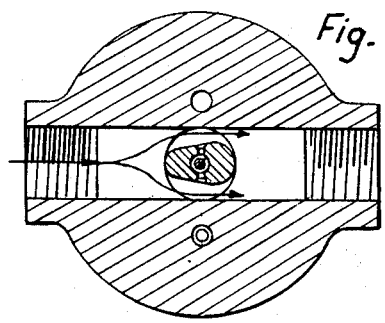
Inventor
Lucien Péras
By Stevens, Davis, Miller & Mosher
Attorneys

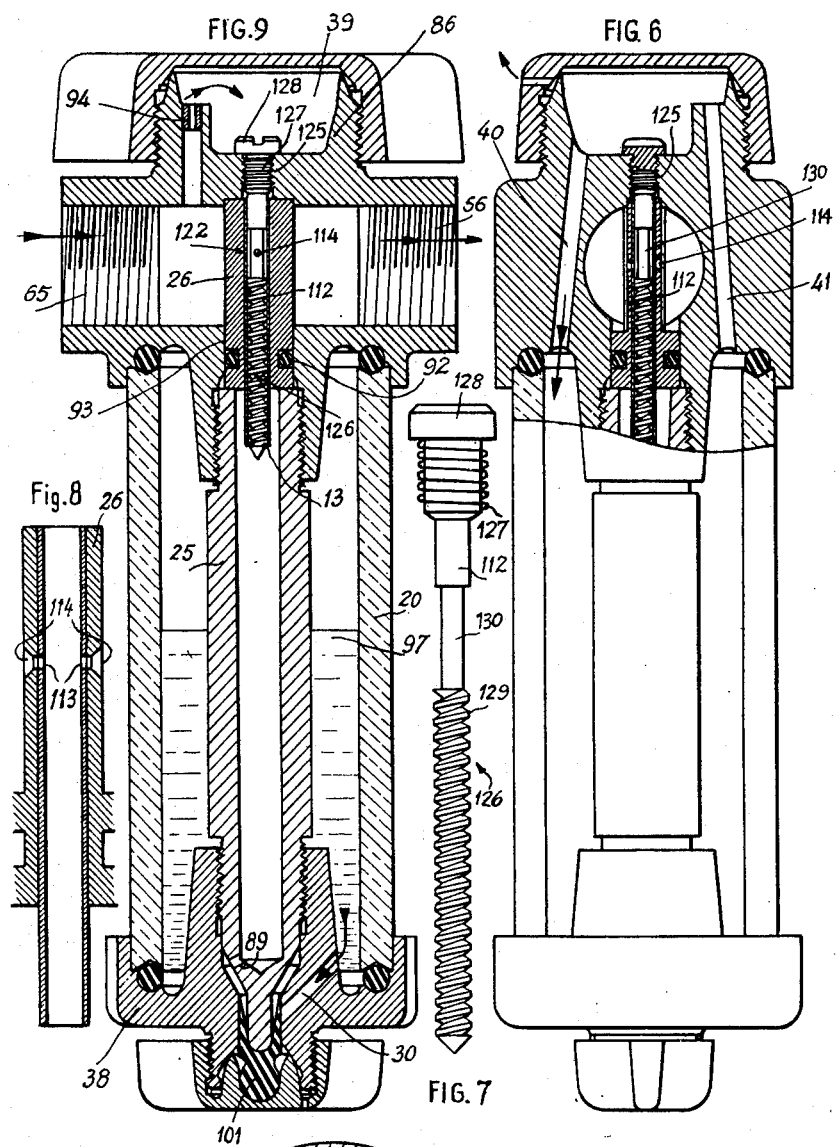

United States Patent Office 3,086,615
Patented Apr. 23, 1963

3,086,615
AIR LINE LUBRICATOR
Lucien Péras, Billancourt, France, assignor to Regie Nationale des Usines Renault, Billancourt, France
Filed Dec. 14, 1959, Ser. No. 859,409
Claims priority, application France Dec. 31, 1958
2 Claims. (Cl. 184—55)

This invention is concerned with improvements in devices for filtering and oiling compressed air for actuating pneumatic apparatus and motors. In devices of this general character, the oil is caused to rise toward the jet opening into the air manifold by means of a wick or felt pad housed in a tube.

The oil rises in this tube without being actually urged or drawn by the air output flowing through the device, except for a moderate influence exerted by the increased suction through the jet. Moreover, the pressure to which the wick is subjected within the tube causes its compression and therefore reduces more or less its porosity, and in frequent cases this compression is such that the flow of oil therethrough is stopped completely.

The essential improvement provided by this invention consists in substituting for the hitherto conventional wick a nylon or like rod or "pencil" formed at either end with a screw-threaded portion of variable length which fits very snugly in the bore of the central tube of the oiling device. These threaded portions are not screwed but tightly fitted in the tube and their purpose is to cause the oil to rise along a relatively long helical path.

This arrangement not only provides a definitely reliable solution to the problem of variations in the rising oil output but accelerates the latter at each "pumping" from the apparatus utilizing the compressed air, the oil output resuming its regular course immediately as the air flow itself resumes its normal value. The importance of this feature will be appreciated by anybody conversant with the art for it constitutes a corrective factor tending to render substantially constant the system for oiling the air flowing through the device, in spite of its unequal output.

It is also the object of this invention to bring several modifications in the oiling device for the purpose of improving its oil-tightness, as will be explained more in detail hereafter.

According to a modified form of embodiment, the device is arranged to operate like a metering distributor adapted to supply the jet with a predetermined quantity of oil per volume unit of compressed air flowing through the device.

In addition, according to the specific applications contemplated, this output must be variable. A rotary pneumatic tackle should receive more oil than a conventional-type pneumatic cylinder or jack, and the oil supply may also vary from one jack to another. Therefore, it is desirable to provide a precise adjustment device for oiling compressed air according to a predetermined law, in a manner similar to the metering function accomplished by a carburetor.

The oiling device according to this modified form of embodiment of the invention is so constructed that it is possible to plot the diagram of the oil outputs as a function of the volume of air flowing through the device, a feature hitherto unknown in devices of this character.

Thus, this invention provides a high-precision device whereby the oiling function may be accurately adjusted in each specific case, thus avoiding excesses that are frequently detrimental and in any case costly, as well as any oil insufficiency, thus affording a reliable, trouble-free and long-lasting operation of the pneumatic apparatus and motors with which it is associated.

This oil rising arrangement can be fitted in the body of existing oiling devices without any modification thereof. Thus, this device, while having the various advantages set forth hereinabove, will retain on the other hand all its properties.

The improved device for rising oil to the jet consists of a screw having a triangular-sectioned thread leaving between adjacent pitches a cylindrical portion, this screw being a tight fit in the tube in order to ensure a proper fluid-tightness between adjacent pitches, the lower portion of this screw extending in the central element of the reservoir while its upper portion, immediately after the threaded portion is formed with a narrow portion registering with the jet orifice or orifices. Thus, by providing a set of screws of different thread sections it is possible to provide with the same device different oil outputs consistent with the air outputs to be supplied.

In order to afford a clearer understanding of this invention and of the manner in which the same may be carried out in practice, reference will be made to the accompanying drawings forming part of this specification and illustrating diagrammatically by way of example a few typical forms of embodiment of the invention. In the drawings:

FIGURE 1 is a vertical axial section of the oiling device, the section being taken upon the plane containing the axis of the air inlet and outlet;

FIGURE 2 is a horizontal section taken upon the line A—B of FIG. 1;

FIGURE 3 is another fragmentary vertical section taken in a plane at right angles to that of FIG. 1;

FIGURE 4 is a detail view showing in elevation the rod inserted in the tube for effecting and regularize the oil rise;

FIGURES 5, 6, 7, 8 and 9 show a modified form of embodiment of the device of this invention, wherein:

FIGURE 5 is a horizontal section taken along the jet axis.

FIGURE 6 is a vertical section taken along an axial plane at right angles to the former;

FIGURES 7 and 8 show on a larger scale on the one hand the output adjustment screw and on the other hand the jet-forming socket;

FIGURE 9 is a vertical section of the oiling device which is taken along the axis of the inlet and outlet pipes.

Referring to the drawings and more particularly to FIG. 1, the oiling device illustrated comprises essentially a cylinder 20 with its bottom 38 and a body head 86 formed with the inlet and outlet orifices or air passages 65, 66, and an upper cap 39, a central lubricant tube 25 and a jet body 26.

According to the improvements constituting the subject-matter of this invention the jet body 26 is provided with a toroidal gasket 92 for sealing the jet in the cavity 93 of head 86. The passage 80 through the head 86 is also provided with a jet-forming member having a gauged orifice 94, this member being positioned at the upper end of passage 80 instead of being inserted in the lower or inlet end thereof. The head 95 of the needle 31 has a downwardly inclined lip formed along its lower peripheral edge and adapted to act as a sealing joint on the seat-forming underlying surface when the needle is tightened home.

The purpose of these various arrangements is on the one hand to improve the fluid-tightness of the lower and upper joints of cylinder 20 and, on the other hand, to provide a fluid connection between the chamber 39 formed in the head and the outlet pipe 96, and also between this outer pipe 96 and the annular-sectioned chamber or lubricant reservoir 97 of cylinder 20.

Another essential arrangement characterizing this invention is the substitution, for the conventional wick enclosed in the central tube 25, of a rod or "pencil" 98 shown separately in FIG. 4 and consisting of plastic or other suitable material such as aluminium, duralumin or other metal. This rod is formed at either end with a screw-threaded portion 99 of a diameter slightly greater than the intermediate rod portion and extending along the whole or one portion of the rod length, this screw-threaded portion 99 fitting snugly in the bore of tube 25. The screw-threaded portions of rod 98 are not actually screwed in the bore of the tube; their purpose is to facilitate the rising of oil along the helical path thus provided. A slot 90 (see FIG. 4) is formed at either end of the rod 98 in order to facilitate the penetration of oil into the screw threads.

A pair of vertically extending air orifices 40 and 41 are formed at opposite ends of head 86 to interconnect chamber 97 and chamber 39.

Chamber 97 and lubricant tube 25 are intercommunicated by passage 30 in cylinder bottom 38, non-return valve 101, and passage 89 in the base of lubricating tube 25.

Vertical bore 112 is formed in jet body 26, extending completely therethrough and opening into lubricant tube 25. Needle 31 extends into bore 112. Jet orifices 114 are formed in jet body 26 and communicate outlet pipe 96 with vertical bore 112.

The operation of the oiling device so far described is characterized by the following properties when the device is in service: The air pressure before the inlet pipe 65 prevails in the chamber 39 through the passage 80 and orifice 94 and also in the chamber 97 of cylinder 20 where it is maintained due to the provision of the said orifices 94, 40 and 41.

The oil contained in cylinder 20 is thus subjected to this upstream pressure.

The toroidal gasket 92 prevents any air from leaking around the jet body. Actually, the pressure exerted upon the oil level and transmitted through the passage 30 to the tube 25 is very moderate. Consequently, the oil level in this tube will rise up to the jet.

Under these conditions, the slightest vacuum or suction produced around the jet orifices will cause an oil suction. Now as the pressure prevailing in the cylinder 20 remains substantially constant, the jet output will be a direct function of the value of this vacuum and therefore of the air output. Thus, the adjustment of the oiling function is practically automatic. If a vacuum occurs in the network utilizing the oiled air and therefore in the outlet pipe 96 (for example when this network is operated or in case of instantaneous demand) the pressure in chamber 39 (and also in cylinder 20) will not drop immediately due to the very small gauge of the orifice 94. As a result, the oil feeds the jet 25 with the same force as before the pressure drop took place so that, in conjunction with the greater suction caused by the vacuum, the oil output will increase considerably during a short time period. This is the purpose of the gauged orifice which accelerates the oil output at each "pumping," as explained hereinabove.

The function of the rod or "pencil" 98 is to retard the flow of oil at the ingress of both the central tube and the jet, this retarding action being proportional to the thread pitch and length. It will constantly keep within the tube 25 a reserve of oil adapted to feed the jet at any time and, on the other hand, to regularize the oil flow by preventing a too fast oil rise for example in case of abnormal vacuum. In comparison with the wick, it provides an absolute invariability of its characteristics and is not subject, like the wick, to fluctuations due to variations in pressure, fouling, etc.

Referring now to the modified form of embodiment shown in FIGS. 5, 6, 7, 8 and 9, all the component elements of the oiling body of the preceding arrangement are reproduced, except for the oil rising and oil output adjustment device according to this invention.

In this case too, the body of the oiling device comprises a cylinder 20 having a bottom 38, a body head 86 formed with air inlet and outlet passages 65 and 66 as well as an upper chamber 39, a central or lubricant tube 25 and jet socket or body 26.

It comprises the improved oil rising device of this invention, which consists of two elements, that is, a stainless tube 122 of copper or brass, enclosed in the jet socket 26, and a rod 126 having a threaded portion 127 screwed in threaded bore 125 formed in the head 86 in alignment with jet body bore 112, and a slotted head 128, this screw extending through the tube 122 so as to fit snugly with its portion 129 therein, the outer diameter of this screw portion 129 corresponding within ±.0004" to the inner diameter of the tube.

The socket 26 is fitted in the bore 93 of head 86 and held in position between the head 86 and the central tube 25. A toroidal gasket 92 eliminates leaks between the socket 26 and its bore in the head 86.

The proper positioning of the parts when assembling same is obtained by fitting the socket 26 into the adequate recess formed to this end in the head 86.

The adjustment screw 126 comprises a screw-threaded portion 129, a narrower portion 130 in the zone corresponding to the jet orifices 114, a plain portion 112 followed by the screw-threaded portion 127 with the head 128 overlying it.

The threaded portion 129 is so termed for the sake of convenience, but it is by no means a conventional screw thread. It consists of a helical groove of adequate pitch having a triangular radial section, for example equilateral, determined and formed very accurately by the depth of the groove which is to have an accuracy of the order of ±.0004". This groove is so formed that a cylindrical outer surface is left between adjacent turns, whereby the contact between the screw and the wall of tube 122, instead of taking place by the bevelled edge usually provided between adjacent pitches as in a conventional screw, is effected by a cylindrical portion forming truncated threads having helical lands providing a reliable fluid-tightness between adjacent pitches or turns while preventing the tube surface from being scored by the screw when introducing the latter, whereas the relatively sharp edges of a conventional screw would become rapidly blunt so that the necessary fluid-tightness between the screw and tube would be impaired.

Chamber 97 and lubricant tube 25 are intercommunicated by passage 30 in cylinder bottom 38, non-return valve 101, and passage 89 in the base of lubricating tube 25.

The tube 122 is also formed with orifices 113 corresponding to the jet orifices 114 of socket 26.

The operation of this modified device will be readily understood; the tube 25 is constantly filled with oil due to the pressure exerted upon the oil level in reservoir 97 by the air pressure passing through the orifices 94, 40 and 41. After rising to the level of the end 13 of tube 122, the oil continues its upward travel within this tube due to the pressure just mentioned hereabove, in conjunction with the suction produced through the jet 114 along the path available therefor, that is, the helical groove of screw 126, while any direct flow along the tube from one pitch to another is avoided in the manner set forth. The relatively long path, of a magnitude which may advantageously be of the order of one foot and of strictly uniform cross-sectional area, constitutes a highly accurate oil-flow regulator. It will be appreciated that by properly selecting the passage area the oil output can be submitted to a real volumetric metering control effect.

From the foregoing it will be readily understood that by using a relatively small number of adjustment settings a wide range of output adjustments can be obtained.

I claim:
1. An air line lubricator comprising a body head having an air passage therethrough, a lubricant reservoir secured to said body head in sealed relation, a chamber defined by said body head, air orifice means intercommunicating said chamber and said air passage and reservoir respectively for effecting the pressurizing of the interior of said reservoir, a jet body carried by said body head in sealed relation and extending across said air passage, a lubricant tube within said reservoir and extending from the bottom of said reservoir to said jet body, said jet body having a longitudinal bore therethrough with said jet body bore being in communication with said lubricant tube and the exterior of said body head, a lubricant orifice through said jet body and opening into said jet body bore and said air passage, and a readily exchangeable metering device in said jet body bore, said metering device being in the form of an elongated rod having a threaded upper portion and a head, said rod having a lower portion with truncated threads defining a helical lubricant metering passage and helical land with said helical land being in sealing contact with that portion of said jet body defining said jet body bore, said rod lower portion projecting below said jet body into said lubricant tube, an intermediate portion of reduced diameter aligned with said lubricant orifice, said body head having a threaded upper bore therethrough aligned with said jet body bore and receiving said threaded upper rod portion, which releasably secures said metering device in said body head and in said jet body with said rod head sealing the upper end of said jet body bore and being sealed relative to said body head, a removable cover being threaded on said body head and normally overlying said metering device head and said chamber.

2. The air line lubricator of claim 1 wherein a nonreturn valve is disposed between the bottom of said lubricant reservoir and said lubricant tube.

References Cited in the file of this patent

UNITED STATES PATENTS

| | | |
|---|---|---|
| 1,955,400 | Zerk | Apr. 17, 1934 |
| 2,375,646 | Grossi | May 8, 1945 |
| 2,511,016 | Semon | June 13, 1950 |
| 2,857,982 | Schwartz | Oct. 28, 1958 |
| 2,857,983 | Shada | Oct. 28, 1958 |
| 2,865,469 | Lyden | Dec. 23, 1958 |
| 2,889,009 | Endebak et al. | June 2, 1959 |
| 2,899,018 | Booth | Aug. 11, 1959 |
| 2,899,977 | Morris | Aug. 18, 1959 |

FOREIGN PATENTS

| | | |
|---|---|---|
| 53,918 | Austria | June 10, 1912 |
| 1,188,352 | France | Mar. 9, 1959 |